July 9, 1968  R. A. DERY  3,391,688
SOLAR OVEN
Filed Oct. 6, 1966

INVENTOR.
Robert A. Dery
BY
McCormick, Paulding & Huber
ATTORNEYS 3,391,688
SOLAR OVEN
Robert A. Dery, Johnny Cake Lane,
New Hartford, Conn. 06057
Filed Oct. 6, 1966, Ser. No. 584,860
7 Claims. (Cl. 126—270)

ABSTRACT OF THE DISCLOSURE

A solar oven having a bowl-shaped body with an outer shell of heated insulating material, and an inner shell spaced from the outer shell, and a dark coating on the inner surface of the shell. A cover is hingedly connected to the body with circular panes held in spaced relation to one another in an annular frame. One of the cover panes has an evacuated space therein for insulation purposes.

---

This invention relates to solar ovens, and deals more particularly with a solar oven which is so constructed as to be capable of generating higher temperatures than has been possible with prior art devices.

An object of the present invention is to provide a solar oven in which the outside area is minimized so as to reduce the heat loss to the outside atmosphere.

Another object of the present invention is to provide a solar oven which is insulated in a novel manner so as to further reduce heat losses to the surrounding atmosphere.

Still another object of the present invention is to provide a solar oven which is made from relatively inexpensive materials, and is so designed as to be well adapted to low cost, high quantity production.

Still another object of the present invention is to provide a solar oven which is made from relatively lightweight materials, and is so designed as to be readily portable.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 1:
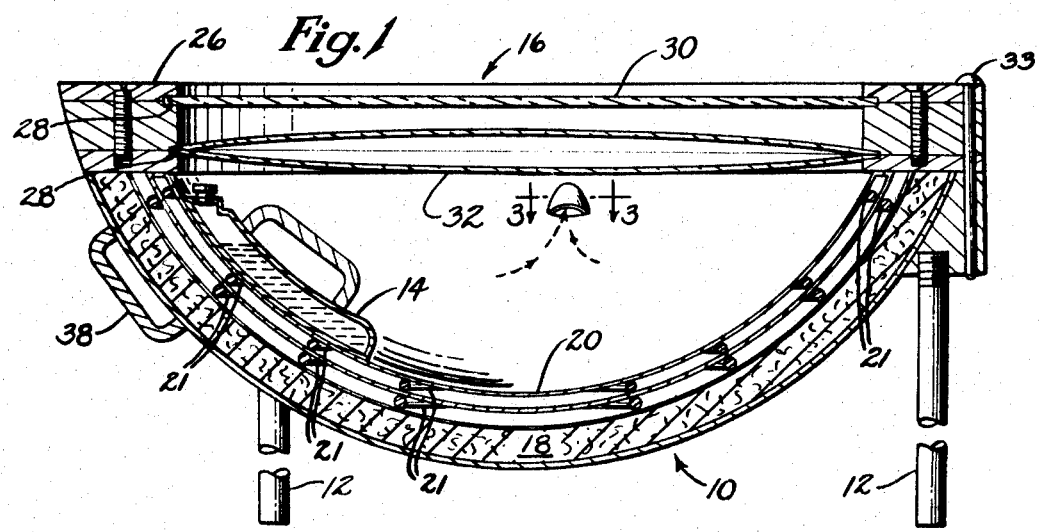
FIG. 1 is a vertical sectional view through a solar oven constructed in accordance with the present invention.
Figure 2:
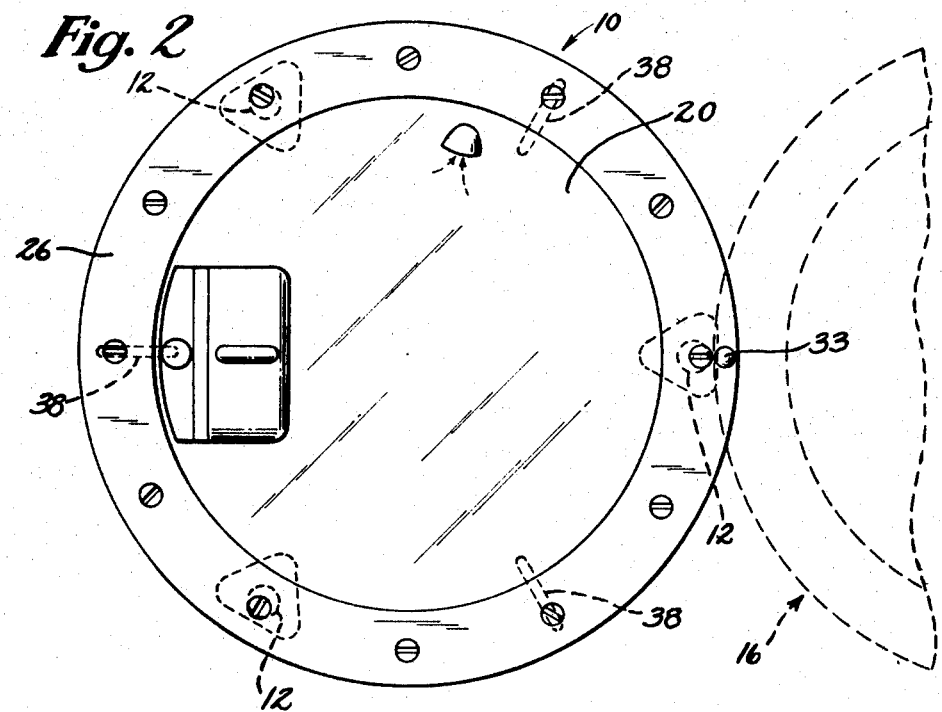
FIG. 2 is a plan view of the oven shown in FIG. 1 with the cover shown in an opened position as indicated by the broken lines.

Turning now to the drawing in greater detail, FIG. 1 shows a solar oven constructed in accordance with the present invention wherein a generally hemispherically-shaped body 10 is provided with three vertical legs 12, 12 so that an upwardly open oven cavity is provided for heating an article, as for example the container of water shown at 14. A circular cover 16 encloses the cavity and is hingedly connected to the edge of the main body 10 so as to be movable to one side to provide access to the cavity as best shown in FIG. 2.

The main body 10 more particularly includes an outer shell of heat insulating material, such as fiberglass, and an inner shell 20 which is mounted in spaced relation to the inner surface of the outer shell to provide a dead air space therebetween. The outer shell 18 is of uniform thickness, and has a generally hemispherically-shaped external contour which is preferably covered with a relatively thin sheet of aluminum, or other suitable material. The inner concave surface of the outer shell 18 is coated with a sheet of aluminum foil so as to reflect heat, thereby retaining said heat in the cavity area thus minimizing heat loss across the outer shell 18. The inner shell 20 of the main body is preferably of hollow construction and conforms generally in contour to that of the outer shell wtih the internal portion of the inner shell 20 evacuated so as to further enhance the heat insulating capability of the main body portion 10. Still with reference to the inner shell 20, the inner surface thereof is concave so as to define the cavity, or heating area of the oven, and is of relatively dark color so as to absorb solar heat energy. A flat black paint has been found to be satisfactory for this purpose. Finally, and still with reference to the inner shell 20, the structure shown comprises two sheets of aluminum which are mounted in spaced relation and peripherally sealed as shown with suitable circular spacers 21, 21 therebetween to prevent collapsing of these aluminum sheets due to the evacuated interior.

The cover 16 comprises an annular, hooped-shaped, frame member 26 which corresponds in size to the circular edge of the hemispherically-shaped body portion 10 as shown. The annular frame 26 preferably defines a plurality of radially inwardly facing grooves as indicated at 28, 28. At least two circular panes of rigid, but transparent material, such as glass or plexiglass, are inserted in said grooves so as to trap at least one layer of dead air therebetween as shown. With further reference to FIG. 1, the lowermost circular pane 32 is preferably made up of two separate sheets of glass which are sealed together around their peripheral edges and define an evacuated space therebetween. As so constructed, the cover 16 is well insulated against heat loss, while at the same time said cover is pervious to the transmission of solar heat energy therethrough.

As mentioned hereinabove, the transparent cover 16 is hingedly connected to the main body 10 by hinge means as shown. Preferably said hinge means comprises a vertical pin 33 so mounted as to permit the cover to be slid in its own horizontal plane to one side as best shown in FIG. 2.

Figure 3:
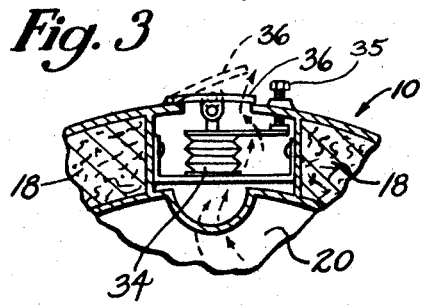
FIG. 3 is a detailed view of the vent opening shown in the oven of FIG. 1.

In further accordance with the present invention vent means is provided for releasing air trapped in the oven cavity itself, and as best shown in FIG. 3, said vent means includes a thermostatically expandable element as for example the bellows 34 which causes a vent cover 36 to open whenever the bellows 34 senses temperature above some predetermined value. Suitable means is also provided for adjusting the position of the bellows 34 in order to vary the temperature at which the vent cover 36 opens to provide a vent path as indicated by the broken arrows. As shown, said means for adjusting the bellows position comprises a screw 35 which is accessible from outside the device as shown in FIG. 3.

Finally, it is to be noted that the legs 12, 12 are removable, and that a handle 38 is provided on the underside of the main body 10 so that the oven shown can be readily disassembled for movement from one place to another. As a result of this construction, and as a result of the materials used, the oven shown will be seen to be quite inexpensive and portable, with no sacrifice to efficiency as a result of the novel design which minimizes heat losses from the oven cavity area to the outside atmosphere.

The invention claimed is:

1. A solar oven comprising a main body which has an outer shell of heat insulating material and has a generally hemispherically shaped lower external surface, said body having an inner shell with a concave upper surface defining an upwardly open cavity and being of relatively dark color so as to absorb solar heat energy, means mounting said shells in spaced relationship to one another for trapping a layer of air therebetween, a transparent cover for said cavity, said cover including an annular frame defining at least two radially inwardly facing grooves, at least two circular panes of rigid transparent material for respective peripheral edges of which are received in said grooves for trapping a layer of air therebetween, and said cover including at least one circular pane which is made of two separate sheets of rigid transparent material sealed together around their peripheral edges adn defining an evacuated space therebetween.

2. A solar oven as set forth in claim 1 and further characterized by hinge means for securing said cover to said main body so that said cover can be moved between closed and open position to provide access to said cavity.

3. A solar oven as set forth in claim 2 and further characterized by vent means for releasing air trapped in said oven cavity, said vent means including a thermostatic element for automatically releasing air when the temperature therein exceeds a predetermined value.

4. A solar oven is set forth in claim 3 wherein said inner shell of said main body comprises a hollow structure conforming to the concave contour of said outer shell and spaced therefrom as aforesaid, and wherein said hollow inner shell is internally evacuated and peripherally sealed so as to further enhance the heat insulating capability of said main body.

5. A solar oven as set forth in claim 4 wherein said outer shell of said main body is made of fiberglass and has a constant wall thickness, and wherein said outer shell is provided with a heat reflective inner surface of aluminum foil.

6. A solar oven as set forth in claim 5 wherein said hollow inner shell is made up of two spaced aluminum sheets of generally hemispherical contour, the innermost of which sheets defines said upper concave heat absorbing surface.

7. A solar oven as set forth in claim 6 and further characterized by at least three depending legs for supporting said oven at a convenient height above the ground.

References Cited
UNITED STATES PATENTS

| | | | |
|---|---|---|---|
| 412,725 | 10/1889 | Calver | 126—271 |
| 2,994,318 | 8/1961 | Lee | 126—270 |
| 3,028,856 | 4/1962 | Daymon | 126—270 |
| 3,174,476 | 3/1965 | Steinberg | 126—270 |
| 3,200,820 | 8/1965 | Garrett | 126—271 |
| 3,279,457 | 10/1966 | Kyryluk | 126—270 |

CHARLES J. MYHRE, *Primary Examiner.*